US012658718B2

(12) United States Patent
Lu

(10) Patent No.: US 12,658,718 B2
(45) Date of Patent: Jun. 16, 2026

(54) ELECTRONIC APPARATUS FOR CHARGING A BATTERY USING A PHOTOELECTRIC SENSING MODULE

(71) Applicant: Chipone Technology (Beijing) Co., Ltd., Beijing (CN)

(72) Inventor: Zhenghua Lu, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 674 days.

(21) Appl. No.: 18/187,777

(22) Filed: Mar. 22, 2023

(65) Prior Publication Data

US 2023/0238823 A1 Jul. 27, 2023

Related U.S. Application Data

(63) Continuation of application No. PCT/CN2021/117267, filed on Sep. 8, 2021.

(30) Foreign Application Priority Data

Dec. 1, 2020 (CN) .......................... 202011392692.0

(51) Int. Cl.
*H02J 7/35* (2006.01)
*G06V 40/13* (2022.01)
(Continued)

(52) U.S. Cl.
CPC ............ *H02J 7/35* (2013.01); *G06V 40/1318* (2022.01); *H02J 7/971* (2026.01); *G01J 1/44* (2013.01)

(58) Field of Classification Search
CPC ....................................................... H02J 7/35
(Continued)

(56) References Cited

U.S. PATENT DOCUMENTS

2014/0192035 A1* 7/2014 Tai ......................... H04N 25/78
345/211
2020/0302255 A1* 9/2020 Amin ...................... H04B 5/72
(Continued)

FOREIGN PATENT DOCUMENTS

CN 106532892 3/2017
CN 109508135 3/2019
(Continued)

OTHER PUBLICATIONS

WIPO, International Search Report mailed Nov. 26, 2021, in PCT/CN2021/117267, 2 pgs.

*Primary Examiner* — Yalkew Fantu
(74) *Attorney, Agent, or Firm* — Henry Patent Law Firm PLLC

(57) ABSTRACT

The present disclosure relates to an electronic apparatus, a display panel, and an electronic device. The apparatus comprises: a photoelectric sensing module comprising a plurality of sensing units, the sensing units being used for converting optical signals into electrical signals, and the photoelectric sensing module being used for acquiring brightness information during fingerprint recognition; and a power management module electrically connected to the photoelectric sensing module and used for, when the state of the photoelectric sensing module satisfies a preset condition, charging a battery by using the electrical signals output by the plurality of sensing units. According to embodiments of the present disclosure, when the state of the photoelectric sensing module satisfies the preset condition, the apparatus can use the electric signals output by the plurality of sensing units to charge the battery, thereby prolonging the battery life.

12 Claims, 2 Drawing Sheets

(51) Int. Cl.
    *H02J 7/90*           (2026.01)
    *G01J 1/44*           (2006.01)

(58) Field of Classification Search
    USPC .......................................................... 320/107
    See application file for complete search history.

(56) References Cited

U.S. PATENT DOCUMENTS

| | | | | |
|---|---|---|---|---|
| 2020/0319023 A1* | 10/2020 | Ma | .................... | H04N 25/671 |
| 2021/0210964 A1* | 7/2021 | Cao | .................... | H02J 7/00045 |

FOREIGN PATENT DOCUMENTS

| | | |
|---|---|---|
| CN | 109767714 | 5/2019 |
| CN | 110163172 | 8/2019 |
| CN | 111652188 | 9/2020 |
| CN | 111787213 | 10/2020 |
| CN | 112510809 | 3/2021 |

* cited by examiner

ELECTRONIC APPARATUS FOR CHARGING A BATTERY USING A PHOTOELECTRIC SENSING MODULE

CROSS-REFERENCE TO RELATED APPLICATIONS

The present disclosure is a continuation of and claims priority under 35 U.S.C. 120 to PCT Application No. PCT/CN2021/117267, filed on Sep. 8, 2021, which claims priority to Chinese Patent Application No. 202011392692.0, filed with National Intellectual Property Administration, PRC, on Dec. 1, 2020, entitled "ELECTRONIC APPARATUS, DISPLAY PANEL, AND ELECTRONIC DEVICE". All the above referenced priority documents are incorporated herein by reference in their entireties.

TECHNICAL FIELD

The present disclosure relates to the technical field of power supply, in particular to an electronic apparatus, a display panel, and an electronic device.

BACKGROUND

Nowadays the endurance capacities of portable consumer products are still the performance of a major concern for major manufacturers and consumers when purchasing. Power banks are often unable to charge portable devices timely at critical moments for their inconvenience of carrying, and also the batteries per se have a poor battery life. Therefore, there is an urgent need to come up with a new charging scheme to remedy the disadvantages of the inconvenience to carry power banks, thereby improving the endurance capability of batteries, and charging devices in time.

SUMMARY

In view of the above, the present disclosure provides an electronic apparatus, a display panel, and an electronic device capable of improving the endurance capability of batteries and charging devices in time.

According to another aspect of the present disclosure, there is provided an electronic apparatus, the apparatus comprising:

a photoelectric sensing module including a plurality of sensing units, the plurality of sensing units being configured to convert optical signals into electrical signals, wherein the photoelectric sensing module is configured to collect brightness information in fingerprint recognition; and a power management module electrically connected to the photoelectric sensing module and configured to, in a case that a state of the photoelectric sensing module meets a preset condition, charge a battery with electrical signals output by the plurality of sensing units.

In a possible implementation, the preset condition includes the photoelectric sensing module being not used for the fingerprint recognition. e.g., the module being in standby and/or not currently operating in fingerprint recognition.

In a possible implementation, the photoelectric sensing module includes a readout circuit unit configured to perform analog-to-digital conversion on the electrical signals output by the sensing units, wherein the preset condition includes:

the readout circuit unit being in an OFF state (turned off) or an enable switch in the readout circuit unit being in an OFF state.

In a possible implementation, the power management module includes a switch unit and a power management unit, wherein the switch unit includes a plurality of switches each electrically connected to k sensing units and each configured to, in the case that the state of the photoelectric sensing module meets the preset condition, be turned on to transmit the electrical signals to the power management unit, wherein k is a positive integer; and the power management unit is electrically connected to the switch unit, and is configured to process the electrical signals transmitted from the switch unit and to output the processed electrical signals to charge the battery.

In a possible implementation, each of the switches of the switch unit includes a first transistor, a control terminal of each of the first transistors is configured to receive a switch control signal configured to turn on each of the switches in the case that the state of the photoelectric sensing module meets the preset condition, and otherwise turn off each of the switches;

a first terminal of each of the first transistors is electrically connected to the k sensing units, and is configured to receive the electrical signals; and a second terminal of each of the first transistors is electrically connected to the power management unit via a power line.

In a possible implementation, the sensing units respectively include a second transistor, a photo diode, and a capacitor, wherein a first terminal of the second transistor is electrically connected to the first terminal of the first transistor, a control terminal of the second transistor is configured to receive a control signal to turn on the second transistor in the case that the state of the photoelectric sensing module meets the preset condition, a second terminal of the second transistor is electrically connected to a first terminal of the capacitor and a positive terminal of the photo diode, and a second terminal of the capacitor and a negative terminal of the photo diode are grounded.

In a possible implementation, in the case that the state of the photoelectric sensing module meets the preset condition, the second transistors of the plurality of the sensing units are sequentially turned on in groups.

In a possible implementation, the first transistor and the second transistor are metal-oxide-semiconductor field-effect transistors, wherein the first terminal of the first transistor is a source, the second terminal of the first transistor is a drain, and the control terminal of the first transistor is a gate; and the first terminal of the second transistor is a drain, the second terminal of the second transistor is a source, and the control terminal of the second transistor is a gate.

In a possible implementation, the photoelectric sensing module includes sensor glass, the sensor glass includes an optical sensing array, e.g., a flat photo diodes array, and the flat photo diodes array includes a plurality of sensing units.

According to another aspect of the present disclosure, there is provided a display panel including the electronic apparatus.

In a possible implementation, the display panel includes any one or more of an LED display panel, a MiniLED display panel, a MicroLED display panel, or an OLED display panel.

According to another aspect of the present disclosure, there is provided an electronic device including the display panel.

In a possible implementation, the electronic device comprises one of a display, a smart phone, a smart watch, a smart bracelet, a tablet computer, a laptop, an all-in-one computer, an access control apparatus, a desktop computer, an industrial computer, or a portable device.

With the above apparatus, the embodiments of the present disclosure enable charging of batteries by using the electrical signals output by a plurality of sensing units in the case that the state of the photoelectric sensing module meets the preset condition, thereby improving the endurance capability of the batteries.

Additional features and aspects of the present disclosure will become clear from the following detailed description of exemplary embodiments with reference to the attached drawings.

BRIEF DESCRIPTION OF THE DRAWINGS

The drawings, which are incorporated in and constitute part of the specification, show the exemplary embodiments, features and aspects of the present disclosure, and are used to explain the principle of the present disclosure together with the specification.

DETAILED DESCRIPTION

Figure 1:
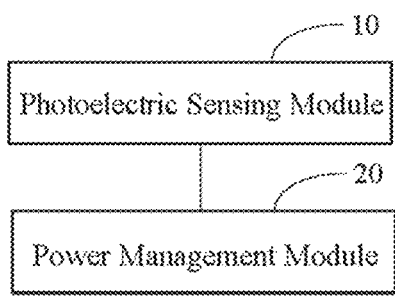
FIG. 1 shows a block diagram of an electronic apparatus according to one embodiment of the present disclosure.

Various exemplary embodiments, features and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the specific term "exemplary" means "used as an example, or embodiment, or explanatory". An "exemplary" embodiment given here is not necessarily construed as being superior to or better than other embodiments.

The term "first", "second", or the like used herein is intended only to differentiate between different elements, rather than indicate any order, number or importance. Likewise, the term "a/an" or "the" or the like is intended to indicate the existence of at least one, rather than limit the number. The term "comprising" or "including" or the like means that the unit or article preceding this term encompasses unit(s) or article(s) following this term and its equivalents, without excluding other units or articles. The term "connection" or "connected" or the like is not limited to physical or mechanical connection, and it may include electrical connection either directly or indirectly. The terms "upper", "lower", "left", "right", and the like are used only to indicate relative positional relationships, and if the absolute position of the referred object changes, the relative positional relationship may also change accordingly.

In addition, numerous details are given in the following specific embodiments for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure becomes apparent.

Referring to FIG. 1, there is shown a block diagram of an electronic apparatus according to one embodiment of the present disclosure.

As shown in FIG. 1, the apparatus comprises:
a photoelectric sensing module 10 including a plurality of sensing units, the plurality of sensing units being configured to convert optical signals into electrical signals, wherein the photoelectric sensing module 10 is configured to collect brightness information in fingerprint recognition; and
a power management module 20 electrically connected to the photoelectric sensing module 10, and configured to, in the case that the state of the photoelectric sensing module 10 meets the preset condition, charge the battery with the electrical signals output by the plurality of sensing units.

With the above apparatus, the embodiments of the present disclosure enable charging of batteries by using the electrical signals output by a plurality of sensing units in the case that the state of the photoelectric sensing module meets the preset condition, thereby improving the endurance capability of the batteries.

The apparatus according to the embodiments of the present disclosure may be applied to the display panel to realize charging of the battery in the display panel. The display panel may be any one of a Light Emitting Diode (LED) display panel, a Mini Light Emitting Diode (MiniLED) display panel, a Micro Light Emitting Diode (MicroLED) display panel, an Organic Light-Emitting Diode (OLED) display panel, or an additional display panel. The display panel is a touch display panel with touch functions.

The apparatus or display panel may be provided in a terminal or in an additional electronic device with a touch display panel to enable charging of the battery therein. The terminal, also referred to as User Equipment (UE), a Mobile Station (MS), a Mobile Terminal (MT), etc., is a device that provides the user with voice and/or data connectivity, e.g., a handheld device with wireless communication functions or an in-vehicle device. At present, some examples of the terminal include a mobile phone, a tablet computer, a laptop, a Personal Digital Assistant (PDA), a Mobile Internet Device (MID), a Wearable Device, a Virtual Reality (VR) device, an Augmented Reality (AR) device, a wireless terminal for industrial control, a wireless terminal for self-driving, a wireless terminal for remote medical surgery, a wireless terminal for smart grid, a wireless terminal for transportation safety, a wireless terminal for smart city, a wireless terminal for smart home, and a wireless terminal for internet of vehicles.

In one example, the battery may be a lithium battery, a lithium polymer battery, or other types of rechargeable batteries. The embodiments of the present disclosure are not limited thereto.

In general, photoelectric sensing modules disposed on electronic devices are energy dissipating components that require batteries to provide electrical energy to operate. For example, with the maturity of the OLED and optical fingerprint recognition technologies, electronic devices such as mobile phones unfold a new era of under-screen fingerprint recognition for full screens. Mainstream portable electronic devices tend to adopt the full-screen optical fingerprint or palmprint recognition scheme, in which a piece of sensor glass is provided as a sensor carrying the Read Out Integrated Circuit (ROIC) to realize the optical fingerprint recognition. When the electronic device is started or activated from the "Sleep" or "Standby" state, or when the user touches the screen, ROIC can perform analog-to-digital conversion on the electrical signal sensed by the sensor glass and output the converted signal to the control chip, for example, a Micro Controller Unit (MCU), as received information (e.g., fingerprint grayscale information) in fingerprint collection. There is no doubt that in these cases, the sensor glass and readout circuits such as ROIC all need to dissipate a lot of electrical energy for operation. Also, even in the case that the ROIC does not need to operate, for example, in the case that the electronic device is in a standby, sleep or even shutdown mode, the battery will continue to supply certain electrical energy to the circuits in the sensor glass and the ROIC, which accelerates the power consumption.

In a possible implementation, the photoelectric sensing module may include sensor glass, the sensor glass includes a Flat Photo Diodes Array (FPDA), and the FPDA includes a plurality of sensing units.

In one example, the sensing units may be a sensor array formed on the basis of Photo Diodes (PD). The PDs are capable of converting optical signals into electrical signals, and the PN junction area is usually made large in the manufacturing process. In this way, the reverse current increases rapidly when there is light, and the larger the light intensity, the stronger the reverse current.

In one example, taking a full-screen mobile phone as an example, the FPDA according to the embodiments of the present disclosure typically includes 3,000 or more of rows and columns, and thus there are approximately $10^7$ PDs. Each of PDs generates a charge of 0.5 to 0.8 pC within 100 us, so it can be calculated that each of PDs generates a current of at most $8\times10^{-9}$ A. In this case, the photoelectric sensing module (one FPDA) according to the embodiments of the present disclosure can generate a current of 0.08 A (80 mA), and this current may be larger after process optimization.

Still taking a mobile phone as an example, the voltage of existing smart phones is about 4.2V, and statistics show that the average standby power consumption of smart phones is typically about 59.15 mW, and accordingly the standby current is about 14 mA. Therefore, according to the embodiments of the present application, the demand for the standby power consumption is satisfied, and additional 66 mA is provided as well. The surplus, even considering the actual loss of peripheral circuits, can reach 50 mA, thus the embodiments of the present application can replenish the battery and improve the endurance capability of the battery.

The embodiments of the present application may take advantage of the photoelectric conversion characteristic of the sensor glass, to reverse charge the battery by using the electrical signals obtained from the sensing units when the sensor glass is not required to provide brightness information for the fingerprint recognition, thereby improving the endurance capability of the battery.

In a possible implementation, the preset condition may include that the photoelectric sensing module is not used to perform the fingerprint recognition. Further, the photoelectric sensing module does not need to provide brightness information for the fingerprint recognition.

Figure 2:
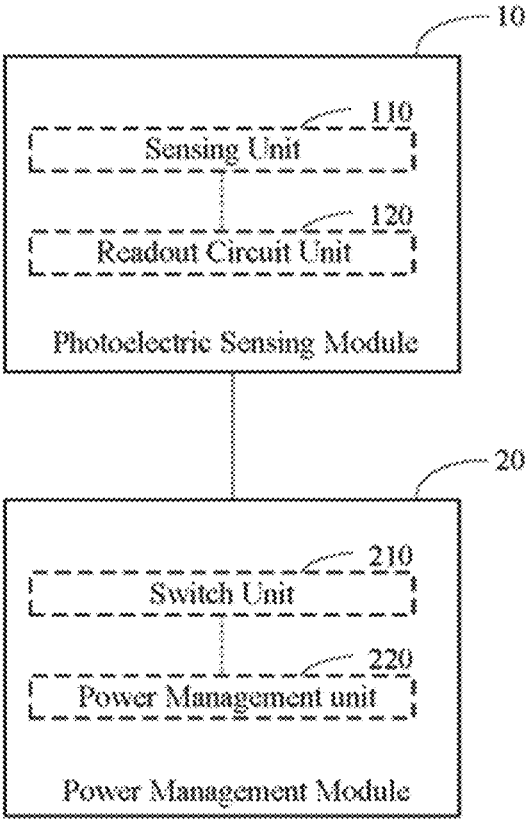
FIG. 2 shows a block diagram of an electronic apparatus according to one embodiment of the present disclosure.

Referring to FIG. 2, there is shown a block diagram of an electronic apparatus according to one embodiment of the present disclosure.

In a possible implementation, as shown in FIG. 2, the photoelectric sensing module may include a sensing unit 110 and a readout circuit unit 120. The readout circuit unit 120 may be configured to perform analog-to-digital conversion on the electrical signals output by the sensing unit. The preset condition may include the condition that the readout circuit unit 120 is in an OFF state or an enable switch in the readout circuit unit 120 is in an OFF state.

In one example, the readout circuit unit 120 may include an analog-to-digital converter or an ROIC. Both of the analog-to-digital converter and the ROIC may be implemented by related technologies. The embodiments of the present application do not limit the specific implementation of the readout circuit unit 120.

In one example, taking the ROIC as an example, the ROIC may be provided with an enable switch (or a path switch to control its connection with the sensing unit). When the electronic device is in a standby state or in other cases, the ROIC does not require acquiring an electrical signal from the photoelectric sensing module to perform the analog-to-digital conversion, so the control chip in the electronic device may turn off the enable switch in the ROIC, and the ROIC stops the analog-to-digital conversion (or turn off the path switch to disconnect from the sensing unit). In this case, the photoelectric sensing module continues to make use of the ambient light signals to generate electrical signals. Therefore, according to the embodiments of the present disclosure, these electrical signals may be used to charge the battery.

In a possible implementation, as shown in FIG. 2, the power management module 20 may include a switch unit 210 and a power management unit 220, wherein the switch unit 210 may include a plurality of switches each electrically connected to k sensing units and each configured to, in the case that the state of the photoelectric sensing module meets the preset condition, be turned on to transmit the electrical signals to the power management unit 220, wherein k is a positive integer; and the power management unit 220 is electrically connected to the switch unit 210, and is configured to process the electrical signals transmitted from the switch unit 210, and to output processed electrical signals to charge the battery.

In one example, the power management unit 220 may include a power management chip. The power management chip may perform voltage stabilization, filtering, etc. on the received electrical signals. The power management chip may be implemented by related technologies, or by direct use of a commercially available power management chip. The embodiments of the present disclosure are not limited thereto.

After the electrical signals are processed by the power management unit 220, a stable voltage may be obtained. The processed electrical signals can be used to charge the battery, and to directly power other active components or devices as well, for example, supplying the electronic device with electricity necessary for standby and charging the battery with the excess electricity. Certainly, it is also practicable to charge the battery and then supply power to active components or devices via the battery.

The electronic apparatus will be exemplarily described below with reference to specific examples.

Figure 3:
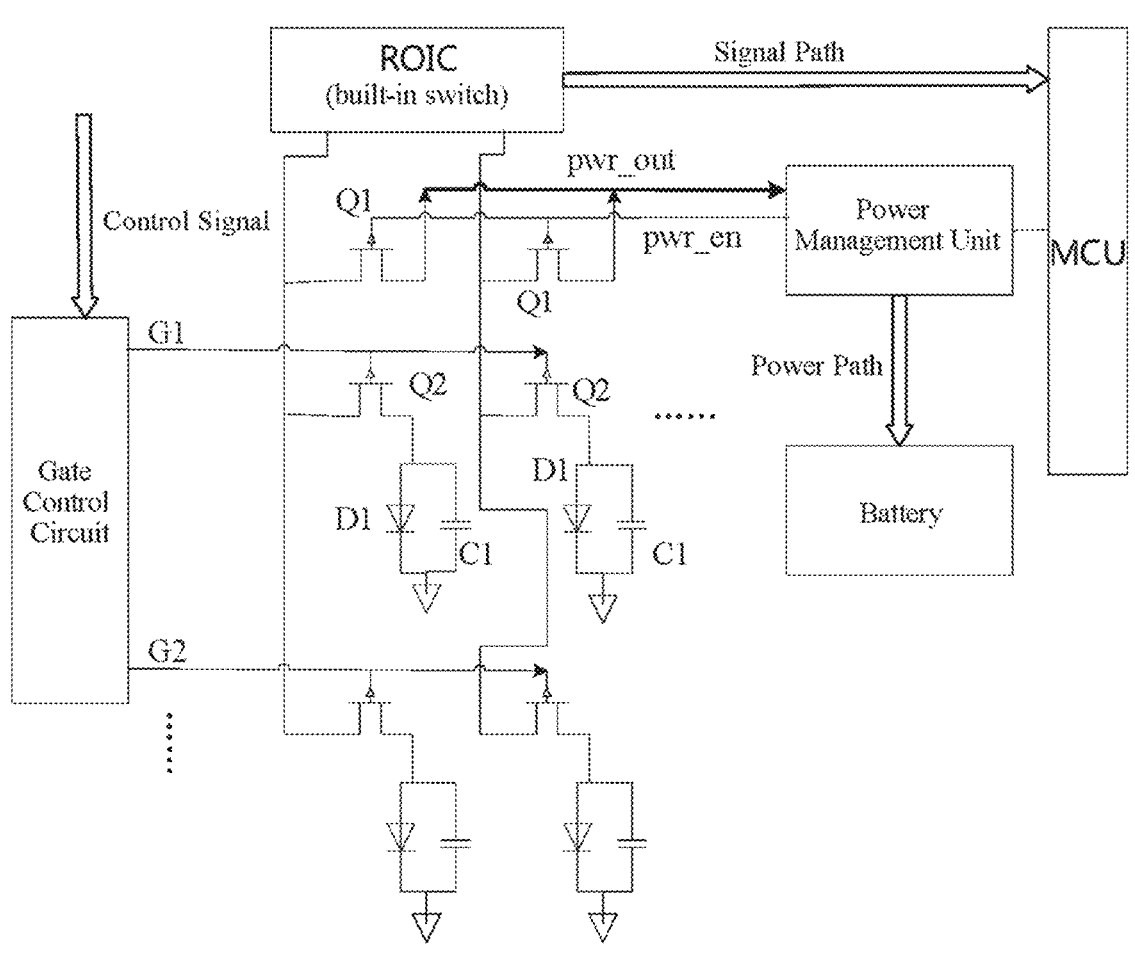
FIG. 3 shows a schematic diagram of an electronic apparatus according to one embodiment of the present disclosure.

Referring to FIG. 3, there is shown a schematic diagram of an electronic apparatus according to one embodiment of the present disclosure.

In a possible implementation, as shown in FIG. 3, each of the switches of the switch unit may include a first transistor Q1, that is, the switch unit may include a plurality of first transistors Q1.

In one example, as shown in FIG. 3, the control terminal of each of the first transistors Q1 is configured to receive a switch control signal pwr_en that is configured to turn on each of the switches in the case that the state of the photoelectric sensing module meets the preset condition, and otherwise turn off each of the switches.

In one example, the switch control signal pwr_en may come from an external controller of the electronic apparatus, e.g., the controller of the electronic device. The controller may be implemented by a dedicated hardware circuit or by a general-purpose hardware circuit, e.g., by a general-purpose chip. The embodiments of the present disclosure do not limit the type of the chip. FIG. 3 takes a microcontroller unit (MCU) as an example for illustration.

In a possible implementation, the chip may include a processor. The processor may include a controller with an instruction execution function in the electronic device. The processor may be implemented in any appropriate manner. For example, it may be implemented by a microprocessor, a Central Processing Unit (CPU), the control logic part in the memory controller, etc. Within the processor 101, the executable instructions may be executed by hardware circuits such as a logic gate, a switch, an Application Specific Integrated Circuit (ASIC), a programmable logic controller, and an embedded microcontroller.

In one example, when determining that the state of the photoelectric sensing module meets the preset condition, the controller (MCU) can control the enable switch in the ROIC to be turned off, to keep the ROIC in the silent state (or referred to as the idle state, in which operations such as analog-to-digital conversion are not performed), and the controller can also control the switches of the switch unit in the power management module to be turned on, such that the electrical signals output by the sensing module are transmitted to the power management unit.

In one example, the switch control signal of the switch unit may also be output by the power management unit. For example, when determining that the state of the photoelectric sensing module meets the preset condition, the controller (MCU) can control the enable switch in the ROIC to be turned off, to keep the ROIC in the silent state; and the controller can also control the power management unit to output a switch control signal and control the switches of the switch unit to be turned on, such that the electrical signals output by the sensing module are transmitted to the power management unit.

In one example, as shown in FIG. 3, the first terminal of each of the first transistors Q1 is electrically connected to k sensing units, and is configured to receive the electrical signals; and the second terminal of each of the first transistors Q1 is electrically connected to the power management unit via a power line pwr_out.

In one example, the width of the power line pwr_out is greater than that of the signal line (e.g., the connection line between the control terminal of the first transistor Q1 and the power management unit), so as to ensure safe passage of the rated current. The specific width of the power line pwr_out may be set as required.

In a possible implementation, as shown in FIG. 3, the sensing unit may include a second transistor Q2, a photo diode D1, and a capacitor C1, wherein a first terminal of the second transistor Q2 is electrically connected to the first terminal of the first transistor Q1, a control terminal of the second transistor Q2 is configured to receive a control signal to turn on the second transistor in the case that the state of the photoelectric sensing module meets the preset condition, a second terminal of the second transistor Q2 is electrically connected to a first terminal of the capacitor C1 and a positive terminal of the photo diode D1, and a second terminal of the capacitor C1 and a negative terminal of the photo diode D1 are grounded.

In one example, the control signal of the second transistor Q2 may be sent by the gate control circuit. For example, when determining that the state of the photoelectric sensing module meets the preset condition, the controller (MCU) may further control the gate control circuit to output the control signal to control each of the second transistors Q2 to be turned on, such that the electrical signals of the capacitor C1 are transmitted to the power management unit.

In one example, the gate control circuit may be provided outside the sensing module or inside the sensing module. For example, the gate control circuit may be provided in the sensing unit. The embodiments of the present application are not limited thereto.

In one example, the gate control circuit may be implemented by related technologies. The embodiments of the present application are not limited thereto.

In a possible implementation, in the case that the state of the photoelectric sensing module meets the preset condition, the second transistors of a plurality of sensing units may be sequentially turned on in groups.

In one example, the way of grouping may be: one second transistor for one group, or more second transistors for one group. The more second transistors for one group may be determined according to the arrangement of PDs in the FPDA. For example, as shown in FIG. 3, each row serves as a group, and each group has a uniform control signal (such as G1 or G2).

By controlling the second transistors of a plurality of sensing units to be sequentially turned on in groups, the embodiments of the present disclosure can avoid a heavy current, such as inrush, generated by simultaneously turning on all of the second transistors, avoiding circuit burnout.

In a possible implementation, the first transistor and the second transistor may be Metal-Oxide-Semiconductor Field-Effect Transistors (MOSFET), wherein the first terminal of the first transistor Q1 is a source, the second terminal of the first transistor Q1 is a drain, and the control terminal of the first transistor Q1 is a gate; and the first terminal of the second transistor Q2 is a drain, the second terminal of the second transistor Q2 is a source, and the control terminal of the second transistor Q2 is a gate.

In one example, in the electronic apparatus as shown in FIG. 3, when light is incident, the photo diodes D1 will generate a charge, which is temporarily stored in the capacitor C1. That is, the optical signals are converted into electrical signals and the electrical signals are stored in the capacitor C1.

In the case that the state of the photoelectric sensing module meets the preset condition (e.g., the electronic device is in the standby state or in no need of a touch function), the switch control signals pwr_en are used to control each of the first transistors Q1 of the switch unit to be turned on, to control the enable switch inside the ROIC to be turned off, and to control the gate control circuit to turn on all of the second transistors Q2 (which may be sequentially turned on in groups) in the sensing units. At this time, the drains of all of the second transistors Q2 will be connected together, and the current (capacitor C1) generated by PDs is concentrated on the path of the power line pwr_out and transmitted to the power management unit. The power management unit directs the current into the battery to enable the reverse charging.

Figure 4:
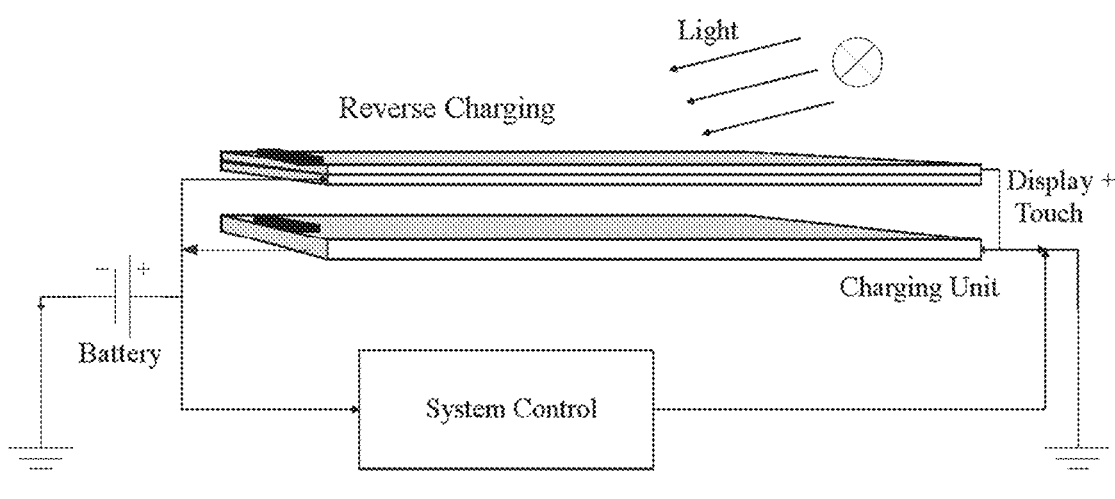
FIG. 4 shows a schematic diagram of an application scenario of an electronic apparatus according to one embodiment of the present disclosure.

Referring to FIG. 4, there is shown a schematic diagram of an application scenario of an electronic apparatus according to one embodiment of the present disclosure.

In one example, as shown in FIG. 4, the electronic device (such as a smart phone) generally includes a display panel, a touch component (such as a touch chip or a touch sensor), a system control component such as a Microcontroller Unit (MCU), and a battery. By adding an electronic apparatus to the electronic device, the embodiments of the present disclosure enable to make use of ambient light to reverse charge the battery in the case that the state of the photoelectric sensing module in the electronic apparatus meets the preset condition.

The electronic apparatus according to the embodiments of the present disclosure is designed to improve the endurance capability of portable electronic products. Based upon the under-screen fingerprint sensors for full screens, ambient light may be converted into electrical energy. As the under-screen fingerprint recognition technology is popular, there is more room for optimization of the endurance capacity of the battery. Electronic devices such as traditional mobile phones can only be used as energy (electrical energy) dissipating components. However, the electronic apparatus according to the present disclosure may become energy generating components to meet their own power consumption demand, by taking advantage of the characteristic of the full-screen fingerprint sensor, i.e., converting optical signals into electrical signals and after optimizing with special processes, the total energy of the electrical signals is very considerable, thereby achieving the capability of providing electrical energy to the system or even providing reverse charging of the battery in case of standby or not collecting data. By converting inexpensive and almost ubiquitous ambient light into electrical energy and collecting it in the battery, the embodiments of the present disclosure not only address the problem about energy consumption, but also achieve a cleaner way to utilize energy without impacting normal use in practice.

Although the embodiments of the present disclosure have been described above, the foregoing descriptions are exemplary but not exhaustive, and the disclosed embodiments are not limiting. For a person skilled in the art, a number of modifications and variations are obvious without departing from the scope and spirit of the described embodiments. The terms used herein are intended to provide the best explanations on the principles of the embodiments, practical applications, or technical improvements to the technologies in the market, or to make the embodiments described herein understood to other persons skilled in the art.

What is claimed is:

1. An electronic apparatus, wherein the apparatus comprises:
   a photoelectric sensing module including a plurality of sensing units, the plurality of sensing units being configured to convert optical signals into electrical signals, wherein the photoelectric sensing module is configured to collect brightness information in fingerprint recognition; and
   a power management module electrically connected to the photoelectric sensing module and configured to, in response to a state of the photoelectric sensing module meeting a preset condition, charge a battery with the electrical signals output by the plurality of sensing units,
   wherein the power management module comprises a switch unit and a power management unit,
   wherein the switch unit comprises a plurality of switches each electrically connected to k sensing units and each configured to, in response to the state of the photoelectric sensing module meeting the preset condition, be turned on to transmit the electrical signals to the power management unit, wherein k is a positive integer; and
   wherein the power management unit is electrically connected to the switch unit, and is configured to process the electrical signals transmitted from the switch unit and to output processed electrical signals to charge the battery.

2. The electronic apparatus according to claim 1, wherein the preset condition comprises the photoelectric sensing module not being used for the fingerprint recognition.

3. The electronic apparatus according to claim 1, wherein the photoelectric sensing module comprises a readout circuit unit configured to perform analog-to-digital conversion on the electrical signals output by the plurality of sensing units, wherein the preset condition comprises the readout circuit unit being in an OFF state or an enable switch in the readout circuit unit being in an OFF state.

4. The electronic apparatus according to claim 1, wherein each switch of the switch unit comprises a first transistor,
   a control terminal of the first transistor is configured to receive a switch control signal that is configured to turn on the switch in response to the state of the photoelectric sensing module meeting the preset condition, and otherwise turn off the switch;
   a first terminal of the first transistor is electrically connected to the k sensing units, and is configured to receive the electrical signals; and
   a second terminal of the first transistor is electrically connected to the power management unit via a power line.

5. The electronic apparatus according to claim 4, wherein each sensing unit comprises
   a second transistor, a photo diode, and a capacitor, wherein
   a first terminal of the second transistor is electrically connected to the first terminal of the first transistor,
   a control terminal of the second transistor is configured to receive a control signal to turn on the second transistor in response to the state of the photoelectric sensing module meeting the preset condition,
   a second terminal of the second transistor is electrically connected to a first terminal of the capacitor and a positive terminal of the photo diode, and
   a second terminal of the capacitor and a negative terminal of the photo diode are grounded.

6. The electronic apparatus according to claim 5, wherein in response to the state of the photoelectric sensing module meeting the preset condition, the second transistors of the plurality of sensing units are sequentially turned on in groups.

7. The electronic apparatus according to claim 5, wherein the first transistor and the second transistor are metal-oxide-semiconductor field-effect transistors, wherein the first terminal of the first transistor is a source, the second terminal of the first transistor is a drain, and the control terminal of the first transistor is a gate; and the first terminal of the second transistor is a drain, the second terminal of the second transistor is a source, and the control terminal of the second transistor is a gate.

8. The electronic apparatus according to claim 1, wherein the photoelectric sensing module comprises sensor glass, the sensor glass comprises a flat photo diodes array, and the flat photo diodes array comprises the plurality of sensing units.

9. A display panel comprising an electronic apparatus, wherein the electronic apparatus comprises:

a photoelectric sensing module including a plurality of sensing units, the plurality of sensing units being configured to convert optical signals into electrical signals, wherein the photoelectric sensing module is configured to collect brightness information in fingerprint recognition; and a power management module electrically connected to the photoelectric sensing module and configured to, in response to a state of the photoelectric sensing module meeting a preset condition, charge a battery with the electrical signals output by the plurality of sensing units, wherein the power management module comprises a switch unit and a power management unit, wherein the switch unit comprises a plurality of switches each electrically connected to k sensing units and each configured to, in response to the state of the photoelectric sensing module meeting the preset condition, be turned on to transmit the electrical signals to the power management unit, wherein k is a positive integer; and wherein the power management unit is electrically connected to the switch unit, and is configured to process the electrical signals transmitted from the switch unit and to output processed electrical signals to charge the battery.

10. The display panel according to claim 9, wherein the display panel comprises one or more of: an LED display panel, a MiniLED display panel, a MicroLED display panel, or an OLED display panel.

11. An electronic device comprising a display panel, the display panel comprising an electronic apparatus, wherein the electronic apparatus comprises:

a photoelectric sensing module including a plurality of sensing units configured to convert optical signals into electrical signals, wherein the photoelectric sensing module is configured to collect brightness information in fingerprint recognition; and a power management module electrically connected to the photoelectric sensing module and configured to, in response to a state of the photoelectric sensing module meeting a preset condition, charge a battery with the electrical signals output by the plurality of sensing units, wherein the power management module comprises a switch unit and a power management unit, wherein the switch unit comprises a plurality of switches each electrically connected to k sensing units and each configured to, in response to the state of the photoelectric sensing module meeting the preset condition, be turned on to transmit the electrical signals to the power management unit, wherein k is a positive integer; and wherein the power management unit is electrically connected to the switch unit, and is configured to process the electrical signals transmitted from the switch unit and to output processed electrical signals to charge the battery.

12. The electronic device according to claim 11, wherein the electronic device comprises one of a display, a smart phone, a smart watch, a smart bracelet, a tablet computer, a laptop, an all-in-one computer, an access control apparatus, a desktop computer, an industrial computer, or a portable device.

* * * * *